L. M. KARNASCH.
UNLOADER VALVE.
APPLICATION FILED APR. 10, 1917.
1,248,665.
Patented Dec. 4, 1917.
3 SHEETS—SHEET 1.
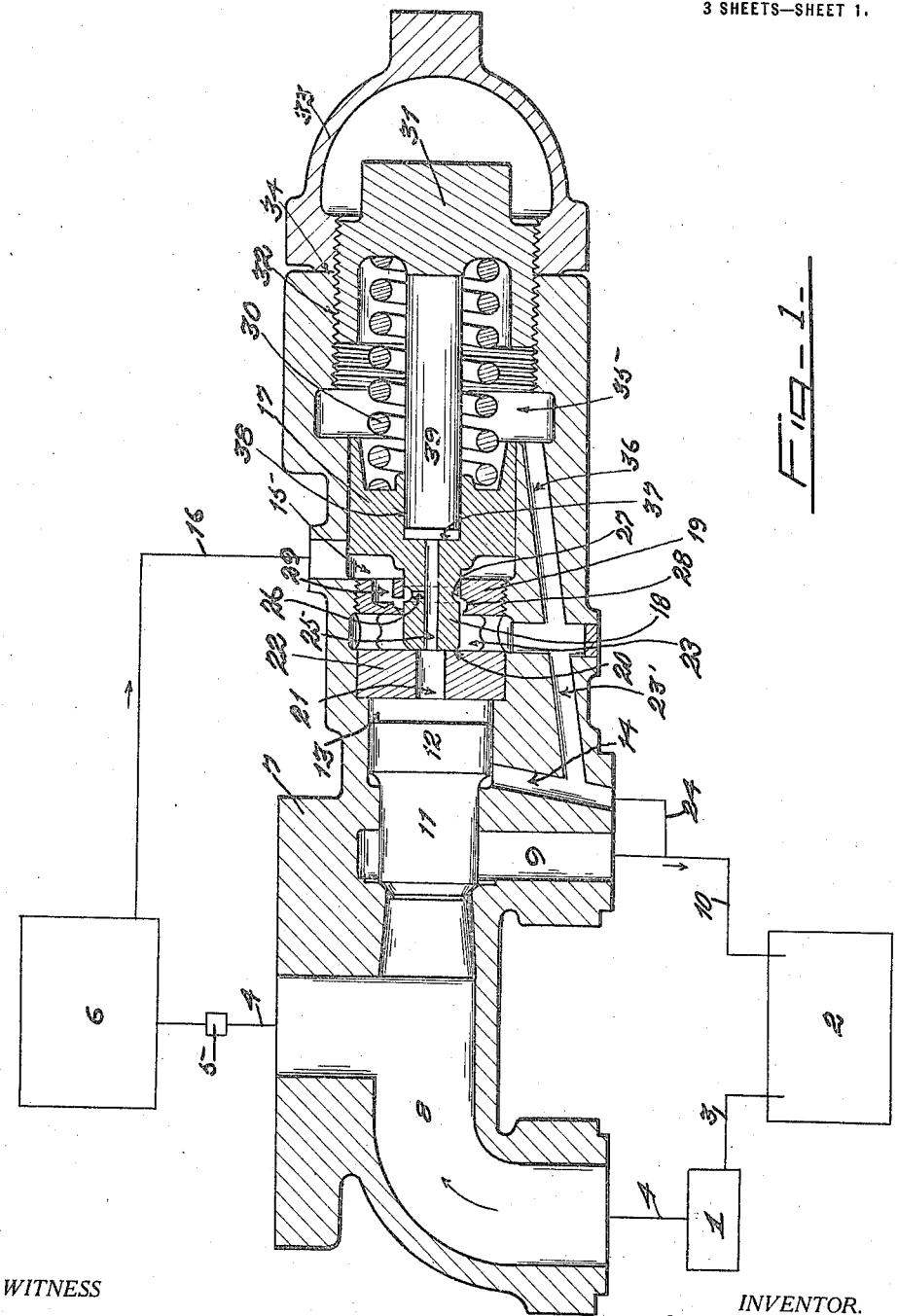
Fig-1-
WITNESS
INVENTOR.
L. M. Karnasch
BY
his ATTORNEYS.

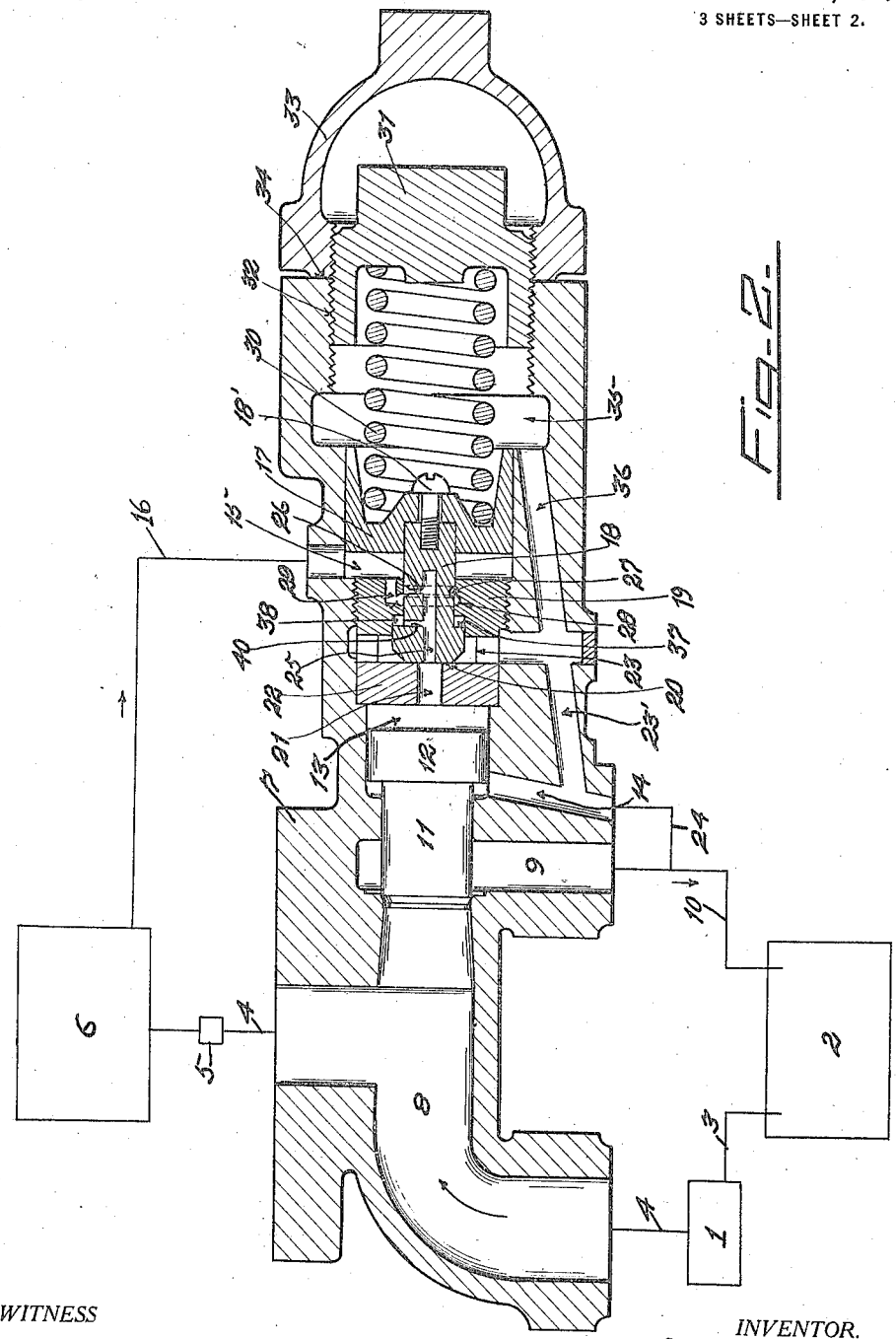

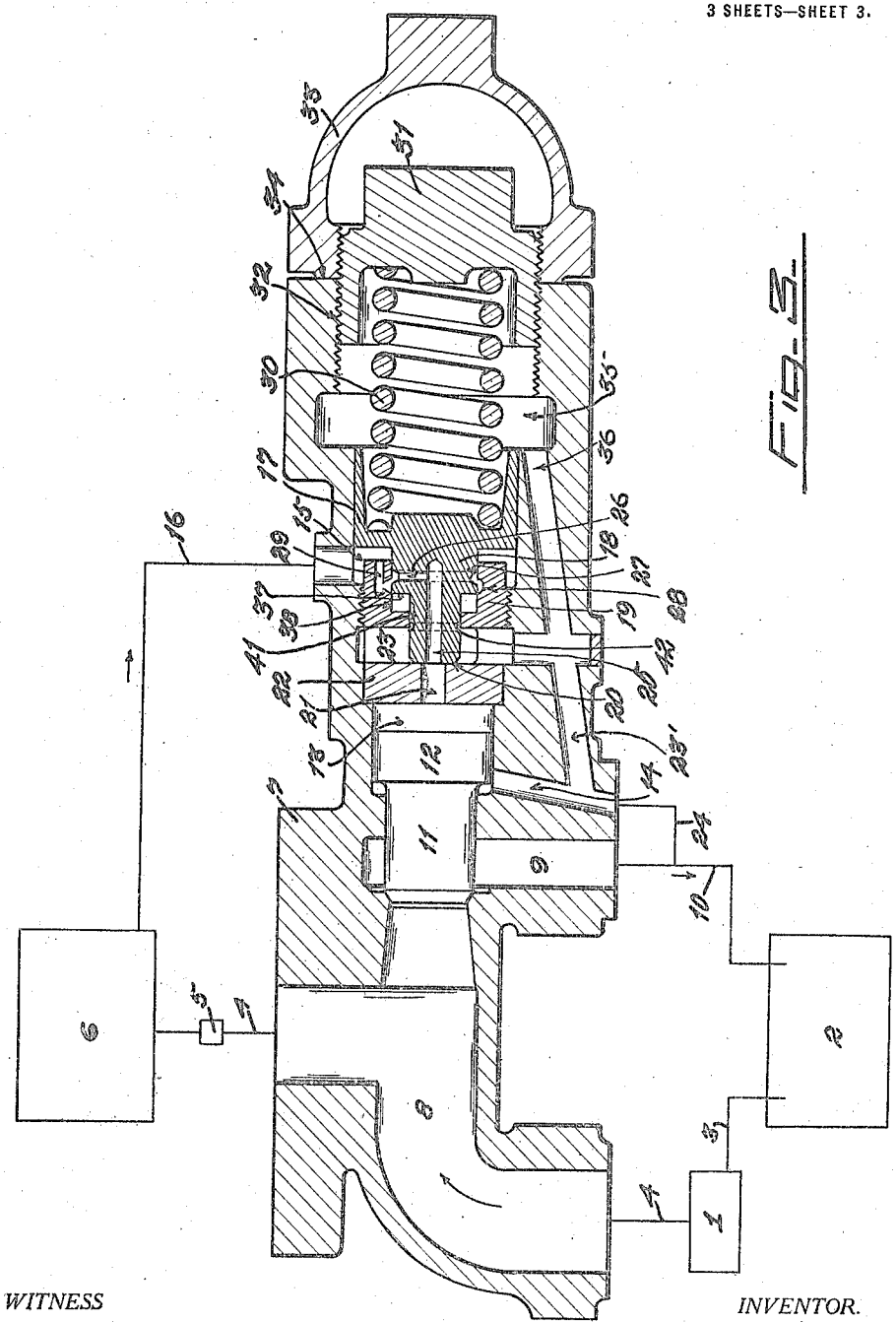

UNITED STATES PATENT OFFICE.

LEOPOLD M. KARNASCH, OF SAN FRANCISCO, CALIFORNIA, ASSIGNOR TO PELTON WATER WHEEL COMPANY, OF SAN FRANCISCO, CALIFORNIA, A CORPORATION OF CALIFORNIA.

UNLOADER-VALVE.

1,248,665.     Specification of Letters Patent.     Patented Dec. 4, 1917.

Application filed April 10, 1917. Serial No. 160,970.

*To all whom it may concern:*

Be it known that I, LEOPOLD M. KARNASCH, a citizen of the United States, residing at the city and county of San Francisco and State of California, have invented certain new and useful Improvements in Unloader-Valves, of which the following is a specification.

The present invention relates to an automatic pressure actuated valve, for use in fluid pressure systems, adapted to provide a comparatively free and unrestricted by-pass for the fluid when the pressure thereof reaches a pre-determined value.

The device is intended for use with fluid pressure circulating systems, such for example as oil governors of the type used for the control of water-wheels. It may also be employed however, in connection with any fluid pressure system in which an automatic by-pass relief valve is desirable.

In its preferred form, the device is intended to be inserted in the fluid pressure line between the pump and a pressure accumulating chamber and is actuated by the pressure in said accumulating chamber, to open and close a comparatively free passage from said pressure line to a sump from which the fluid is again drawn by the pump. Therefore, when the pressure in the accumulating chamber reaches a certain pre-determined point, the relief valve opens, and the fluid is circulated through the by-pass, the sump and the pump, at very low pressure, thus avoiding heating of said fluid, and relieving the pump from unnecessary work. When the pressure in the accumulating chamber falls below the desired value, the relief valve closes and the system is returned to its normal condition.

The present invention constitutes an improvement on the unloader valve, for which United States Letters Patent No. 1,110,567 were granted to Chester B. McAulay on September 15, 1914, and has for its objects the provision of a valve of the described type which is readily adjustable to respond to various degrees of actuating pressure, without otherwise affecting its operation; and further to provide a valve having a suitable casing to prevent exterior leakage.

With the above mentioned and other objects in view, the invention consists in the novel construction and combination of parts hereinafter described, illustrated in the accompanying drawings, and pointed out in the claims hereto appended, it being understood that various changes in the form and construction, within the scope of the claims, may be resorted to without departing from the spirit of the invention.

In order to more fully comprehend the invention, reference should be had to the accompanying sheets of drawings, wherein:—

Figure 1 is a longitudinal section of a preferred form of my improved unloader valve, the connections therefor being shown diagrammatically.

Fig. 2 is a similar view of a modified form of my valve.

Fig. 3 is a similar view of a second modified form of my valve.

In the drawings, the reference numeral 1, designates a pump, actuated in any desired manner, not shown, to draw fluid from a sump 2, through a suction pipe 3, and to force the same through a pressure pipe 4, and a check-valve 5, into a pressure accumulating chamber 6, from which the fluid may be withdrawn and used in any manner not illustrated.

Inserted in the pressure line 4, between the pump 1 and the check-valve 5, is my unloader valve, which is contained within a shell 7 having a passage 8 for the pressure fluid, and a relief passage 9 connected by means of a return pipe 10, with the sump 2. The passage 9 is normally closed to the fluid in the pressure passage 8 by a movable valve member 11, which is provided with an enlarged rear portion 12 operating within a cylindrical chamber 13 formed in the shell 7, and provided with a vent 14.

A second cylinder 15 is formed in the shell 7, to the rear of the valve chamber 13, and is connected by means of a pipe 16, with the pressure accumulating chamber 6. A piston 17 is slidably carried within said cylinder 15, and carries a forwardly projecting stem 18 which passes through the head 19 of the cylinder 15, and forms a valve, at 20, to close an aperture 21 formed in a diaphragm 22, the latter forming the rear head of the valve chamber 13. The space 23, between the cylinder head 19 and the diaphragm 22, is connected by means of a passage 23' and a pipe 24, with the return sump pipe 10.

The stem 18 of the piston 17 is bored axially, as at 25, and said bore is connected by a passage 26, with an annular groove 27 in the surface of said stem, which, in turn, registers with an annular groove 28 in the bore of the head 19 and connects, through said groove and a passage 29, with the cylinder 15. Thus under normal conditions, that is with the parts as shown in the drawings, fluid, at the pressure of that in the pressure accumulating chamber 6, is admitted to the control cylinder 15 and from there, through the passages 29, 28, 27, 26, 25 and 21, to the valve chamber 13, and, acting against the larger end 12 of the valve member 11, holds said valve closed, and prevents the escape of fluid through the relief passage 9.

The piston 17 is held in its normal position, aganist the force of the fluid pressure in the cylinder 15, by a spring 30, backed by an adjusting nut or plug 31, the latter screwing into the end of the shell, as shown at 32. The adjusting plug 31, projects somewhat beyond the end of the shell, as shown, and over said projecting end is screwed a cap 33. A ground joint is provided at 34 between said cap and the end of the shell 7, in order to prevent leakage of fluid at this point. The cap 34 not only prevents leakage, but also serves as a lock nut for the adjusting plug 31. The chamber 35, in which is contained the spring 30, is vented to the sump connection by means of a passage 36.

When the pressure in the accumulating chamber 6 rises above the desired point of release, the force of the fluid pressure on the piston 17 overcomes that of the spring 30, and said piston moves rearwardly. This movement carries the groove 27 in the piston stem 18 out of registry with the groove 28 in the head 19, thereby cutting off the supply of pressure fluid to the valve chamber 13, and at the same time opens the valve 20 to relieve the pressure within said valve chamber 13 and to allow the fluid therein to escape through the passages 21, 23 and 23' and the pipe 24 to the sump. The pressure in the passage 8 therefore opens the relief valve 11, and the fluid from the pump is by-passed through the relief passage 9 and the pipe 10 to the sump, at comparatively low pressure. When the pressure in the accumulator falls below the desired point, the spring 30 moves the piston forwardly, and the relief valve 11 is closed by the pressure of the fluid in the valve chamber 13, thereby returning the system to its normal condition.

In order to render the movements of the piston 17 positive, to insure the complete opening and closing of the various parts controlled thereby, and to prevent the chattering of said piston, I provide means for overbalancing said piston in both its positions. Said over-balancing means has the same result in all three forms illustrated, but differs slightly in the minor details of construction.

In the preferred form shown in Fig. 1 of the drawings, an over-balancing surface 37, is provided, the same forming the head of an auxiliary cylinder 38, formed within the body of the piston 17. An auxiliary piston 39, acting within said cylinder 38, is fixed to the adjusting plug 31 and extends inwardly therefrom. The auxiliary cylinder 38 is in communication with the axial passage 25 in the piston stem 18, and therefore contains fluid under pressure when the valve is in its normal position. The force of said pressure, acting against the over-balancing surface 37, assists the spring 30 to retain the piston 17 in its normal position.

When the pressure in the cylinder 15 becomes great enough to move the piston 17 against the combined forces of the spring 30 and the over-balancing surface 37, the pressure upon said surface is at once relieved, by the closing of the ports 27 and 28, and the opening of the valve at 20. The closing force acting on the rear of the piston 17, is thus reduced, and said piston is rapidly and positively moved to its open position by the pressure of the fluid in the cylinder 15. The reverse action takes place when the pressure in said cylinder falls below the closing point.

In the form of the device illustrated in Fig. 2 of the drawings, the over-balancing surface 37 is formed as a rearwardly facing annular shoulder on the stem 18 of the piston 17 and is acted upon by the pressure of the fluid in an auxiliary chamber 38 formed in the head 19, the pressure being admitted to said chamber from the axial passage 25 in said stem 18 through a radial passage 40. The action of the over-balancing surface in this case is identical with that described above in connection with the form illustrated in Fig. 1. In the form shown in Fig. 2, the stem 18 is shown as connected with the piston 17 by a screw 18'.

In the form of the valve shown in Fig. 3 of the drawings the over-balancing surface 37 is formed as a forwardly facing shoulder upon the stem 18, acting in a direction opposite to the shoulder of Fig. 2. In this form, the over-balancing chamber 38 is connected, by means of a lineal groove 41 and an annular groove 42, both formed in the stem 18, with the space 23 between the head 19 and the diaphragm 22, and this space is vented, as in the other forms into the outlet duct 23'. In this case, the action of the over-balancing surface 37 is opposed to the force of the spring 30. Under normal conditions, there is no pressure in the chamber 38, but when the pressure in the cylinder 15 becomes great enough to move the piston 17, the annular groove 42 in the stem 18 is carried out of registry with the space 23, and at the same time the annular groove 28 in the head 19 is thrown open to the chamber 38, thus admitting the fluid under pressure to the said chamber. The force upon the over-balancing surface 37 thereupon acts with the force upon the area of the piston 17 and moves the same positively and rapidly. The reverse action occurs, as will be readily understood, upon the closing of the valve.

It is to be noted that in all three forms of the device the opening and closing of the controlling ports 27 and 28 is not in any way altered by the movement of the adjusting nut 31, inasmuch as the stem 18 always seats against the diaphragm 22 in the same position, and said ports are formed in the stem 18 of said piston and the fixed head 19.

Having thus described my invention what I claim as new and desire to protect by Letters Patent is:—

1. An unloader valve comprising a shell having a passage for fluid under pressure and a relief passage communicating therewith; a movable valve member normally closing said relief passage; a connection for conducting fluid, at the pressure of that in said fluid pressure passage, to the rear of said valve member for holding the same in closed position; a cylinder within said shell; a movable piston, within said cylinder, actuated by the pressure of the fluid in said connection; a forwardly extending stem, carried by said piston, passing through the head of said cylinder and controlling the release of the fluid in the rear of said valve, said stem and said head having coöperating ports for controlling the admission of pressure fluid to the rear of said valve; an auxiliary over-balancing surface carried by said piston, separate from the main working surface thereof; and a system of coöperating ports for controlling the fluid pressure upon said auxiliary surface in accordance with the position of said piston within its cylinder.

2. An unloader valve comprising a shell having a passage for fluid under pressure and a relief passage communicating therewith; a movable valve member normally closing said relief passage; a connection for conducting fluid, at the pressure of that in said fluid pressure passage, to the rear of said valve member for holding the same in closed position; a cylinder within said shell; a movable piston, within said cylinder, actuated by the pressure of the fluid in said connection; a forwardly extending stem, carried by said piston, passing through the head of said cylinder and controlling the release of the fluid in the rear of said valve, said stem and said head having coöperating ports for controlling the admission of pressure fluid to the rear of said valve; an auxiliary cylinder formed within said piston; a fixed piston working in said auxiliary cylinder, said auxiliary cylinder being adapted to receive fluid under pressure through said coöperating ports only when the main piston is in its normal position, the force of said pressure acting to oppose the force of the fluid pressure upon said main piston; and a spring for retaining said piston in said normal position.

In testimony whereof I have signed my name to this specification in the presence of two subscribing witnesses.

LEOPOLD M. KARNASCH.

Witnesses:
 FREDERICK GFELLER,
 ERNEST W. ORTON.

Copies of this patent may be obtained for five cents each, by addressing the "Commissioner of Patents, Washington, D. C."